United States Patent
Wicht

Patent Number: 5,588,247
Date of Patent: Dec. 31, 1996

[54] RATTLE JIG

[76] Inventor: John E. Wicht, 17515 Territorial Rd., Osseo, Minn. 55369

[21] Appl. No.: 113,185

[22] Filed: Aug. 30, 1993

[51] Int. Cl.⁶ ................................................. A01K 91/00
[52] U.S. Cl. ........................ 43/42.31; 43/42.28; 43/42.4
[58] Field of Search ............................. 43/42.28, 42.31, 43/42.35, 42.4, 42.43, 42.45, 42.26, 42.42, 42.39

[56] References Cited

U.S. PATENT DOCUMENTS

| | | | |
|---|---|---|---|
| 1,858,550 | 2/1930 | Kahle. | |
| 1,878,015 | 2/1931 | Steffensen. | |
| 3,128,572 | 4/1964 | McVay | 43/42.45 |
| 3,803,747 | 4/1974 | Cartwright | 43/42.28 |
| 3,848,353 | 11/1974 | McClellan. | |
| 4,008,539 | 2/1977 | Gardner. | |
| 4,712,326 | 12/1987 | Hoover | 43/42.39 |
| 4,969,287 | 11/1990 | Johnson. | |
| 4,995,189 | 2/1991 | Crihfield. | |
| 5,144,765 | 9/1992 | Keeton. | |
| 5,175,955 | 1/1993 | Wilson | 43/42.39 |
| 5,231,786 | 8/1993 | Hughes | 43/42.39 |
| 5,261,182 | 11/1993 | Link | 43/42.28 |

FOREIGN PATENT DOCUMENTS 2207841  2/1989  United Kingdom ............... 43/42.31

OTHER PUBLICATIONS

*Culprit Clatter Weight*, Gander Mountain 1991 Spring/Summer catalog, p. 40.

Primary Examiner—Scott A. Smith
Assistant Examiner—James Miner
Attorney, Agent, or Firm—Burd, Bartz & Gutenkauf

[57] ABSTRACT

A noise-making rattle jig for use in fishing having a solid metallic body of generally circular cross-section with a forwardly extending body extension of lesser diameter having a fish hook secured to the forwardmost end, and an eyelet for attaching the jig to a fish line at the opposite end of the body. A rattle chamber is provided within the body with at least one noise-making rattle element held loosely within the chamber. A fiber weed guard is secured to the body and extends radially outwardly spaced rearwardly from the barb of the fish hook. The body extension is provided with at least one annular channel to which a rubber camouflage skirt or other accessory may be attached to the jig. Because of environmental concerns the body, body extension and cap are preferably formed from lead-free brass. All other elements are desirably composed of non-leaching non-toxic materials.

9 Claims, 2 Drawing Sheets

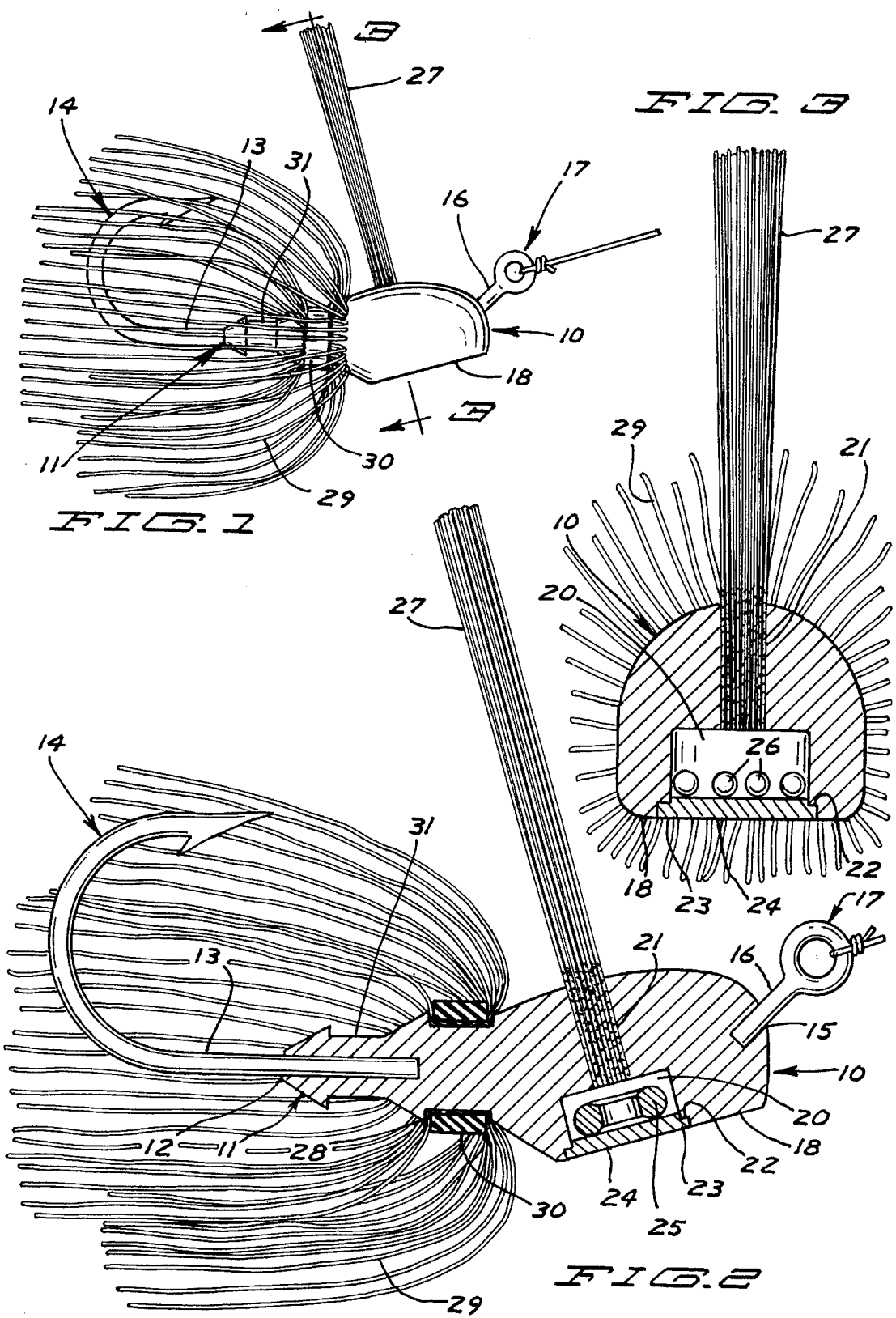

RATTLE JIG

BACKGROUND OF THE INVENTION

1. Field of the Invention

This invention is directed to a rattle jig for attachment to the end of a line for use in fishing. More particularly, the invention is directed to a rattle jig having a precision machined solid brass body having rattle means therein and especially adapted for use in angling for bass.

2. The Prior Art

Fishing appliances having noise-making means associated therewith are known. Exemplary references include the following:

Crihfield U.S. Pat. No. 4,995,189 discloses a noise-making fishing lure including a two piece plastic shell having two chambers therein containing a plurality of metal balls.

McClellan U.S. Pat. No. 3,848,353 discloses a rattle sounder for fishing lures comprising a hollow shell of bullet shaped contour having a chamber with spherical shot or nut-hexagonal slugs therein.

Steffensen U.S. Pat. No. 1,878,015 discloses a fish lure having a two-part metal body which may contain shot therein for the purpose of increasing its weight. There is no disclosure of any resulting production of noise.

Kahle U.S. Pat. No. 1,858,550 discloses a fish line sinker having a tubular body containing a plurality of lead shot to permit varying the weight of the sinker. The patent does not disclose any resulting production of noise.

Gardner U.S. Pat. No. 4,008,539 discloses a noise-making slip sinker having a chamber therein for receiving noise-making objects such as spherical metal balls.

Johnson U.S. Pat. No. 4,969,287 discloses a rattling worm weight having a cavity in which a plurality of rattle members are loosely received.

Keeton U.S. Pat. No. 5,144,765 discloses a noise-making device for lures comprising a sinker in which an external collar is slidable along an elongate rear portion extending from a tapered front portion.

The Gander Mountain 1991 Spring/Summer catalog, on page 40, shows a "Culprit clatter weight" which is described as a clattering worm weight that attracts fish in dark cover, dark water and at night. It includes a hollow body containing shot or similar weights.

Applicant's co-pending application Ser. No. 811,850, now U.S. Pat. No. 5,259,151, issued Nov. 9, 1993, discloses a precision machined solid brass noise-making fish line sinker especially adapted for use in angling for bass.

SUMMARY OF THE INVENTION

Broadly stated the invention is directed to a rattle jig for use in fishing which includes a solid metallic body of generally circular cross-section with a forwardly extending body extension of lesser diameter having a fish hook secured to the forwardmost end, and an eyelet for attaching the jig to a fish line at the opposite end of the body. The shank of the fish hook is aligned generally with the longitudinal axis of the jig body. A rattle chamber is provided within the body with at least one noise-making rattle element held loosely within the chamber. A fiber weed guard is secured to the body and extends radially outwardly spaced rearwardly from the barb of the fish hook. The body extension is provided with at least one annular channel to which a rubber camouflage skirt or other accessory may be attached to the jig.

BRIEF DESCRIPTION OF THE DRAWINGS

The invention is illustrated by the accompanying drawings in which corresponding parts are identified by the same numerals and in which:

FIG. 1 is a side elevation of the rattle jig shown as if being drawn through water in use;

FIG. 2 is a longitudinal cross-section through the jig on an enlarged scale;

FIG. 3 is a transverse section on a somewhat further enlarged scale on the line 3—3 of FIG. 1 and in the direction of the arrows, but shown with alternative rattle means.

DETAIL DESCRIPTION OF THE PREFERRED EMBODIMENT

Figure 4:
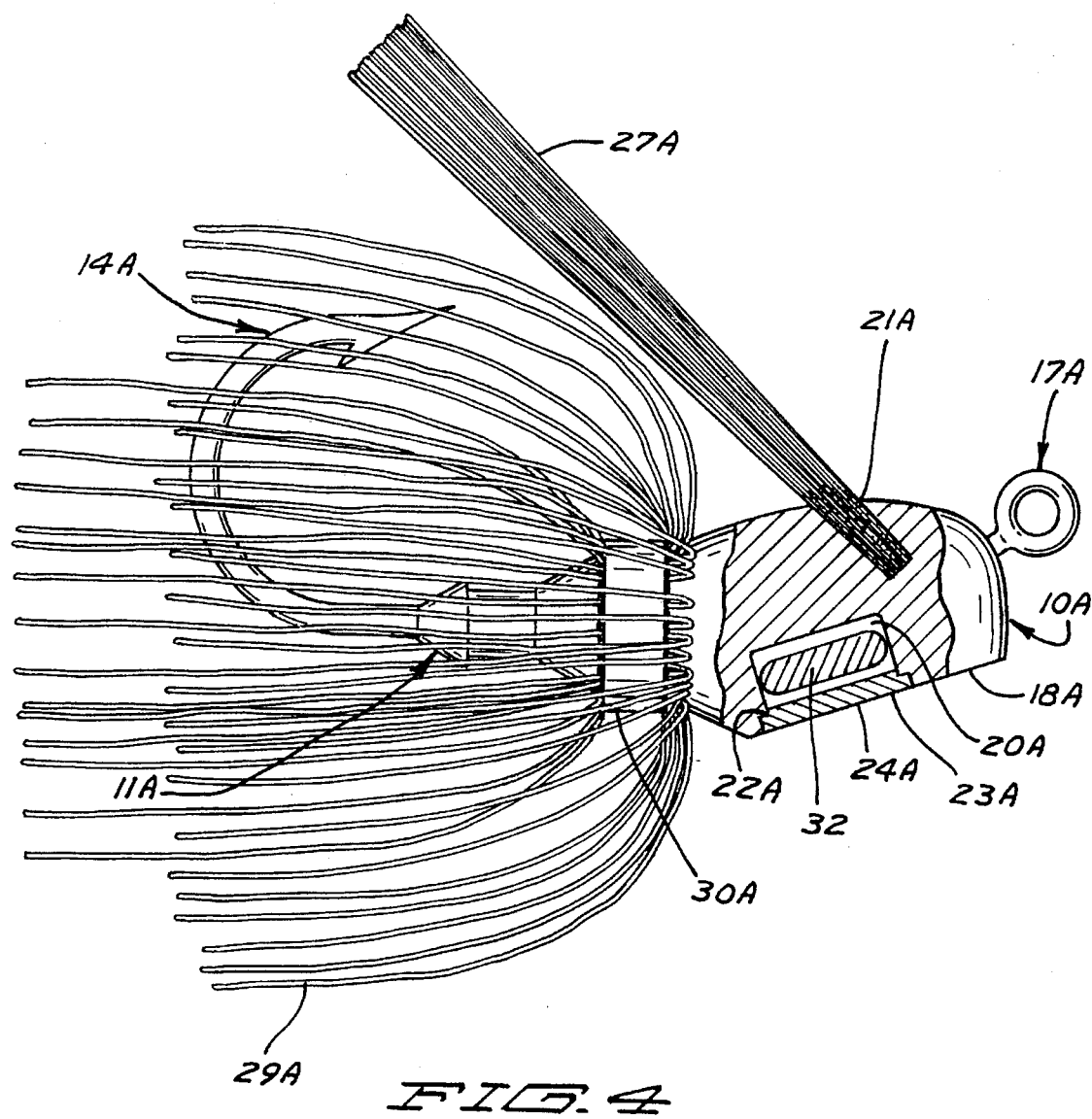
FIG. 4 is a side elevation, partly in section, of an alternative form of rattle jig.

Referring now to the drawings, the rattle jig includes a solid dense metallic body, indicated generally at 10, of generally circular cross-section having an integral forwardly extending body extension of lesser diameter, indicated generally at 11. The body extension 11 includes a central longitudinally extending channel 12 for receiving the shank 13 of a standard barbed fish hook, indicated generally at 14. The hook is rigidly secured to the body, as by means of silver solder or the like. A channel 15 of circular cross-section is provided in the opposite end of body 10 for receiving the shank 16 of an eyelet, indicated generally at 17, which is rigidly secured therein, as by means of silver solder or the like. The axis of channel 15 is disposed at an angle of approximately 45 to 50 degrees from the longitudinal axis of the body and extension so as to optimally orient the jig for passage through water when in use. The hook 14 and eyelet 17 preferably lie in a common plane.

The bottommost face 18 of the body 10 is flattened and at an angle of about 18 to 20 degrees from the longitudinal axis of the body and body extension and in a plane perpendicular to the plane of the hook and eyelet. Water flowing against the inclined bottom face 18 provides some lift to the jig as it is pulled through water in use. A transverse passage of circular cross-section extends through the body, the axis of said passage lying in the plane of the hook and eyelet and perpendicular to the plane of flat face 18. The lowermost end 20 of said passage has a larger diameter than the opposite end 21. That larger end 20 of the passage constitutes a rattle chamber. An annular shoulder 22 set inward from flat face 18 is adapted to receive the annular flange 23 of flat cap 24 which serves as a closure for the rattle chamber. Cap 24 is preferably fit with a press fit into the enlarged passage end 20 with its outer face flush with the surface of flat body face 18. One or more loosely received noise-making rattle elements, such as do-nut-shaped shaped angular metallic ring 25 (FIG. 2), or spherical metal or glass balls 26 (FIG. 3), or a simple flat disc, are provided in the rattle chamber 20. When the jig assembly is jiggled or otherwise moved while in use in fishing the movement of ring 25 or balls 26 within chamber 20 causes a rattling, clattering or clicking sound.

One end of a brush-like fiber weed guard 27 is seated in the smaller diameter end 21 of the transverse passage. The weed guard 27 is composed of a bundle of stiff but flexible fibers, such as nylon or the like, adhesively secured together at one end and adhesively secured within the smaller passage end 21 by a waterproof adhesive, such as an epoxy adhesive. The fibers at the opposite end of the weed guard are free to fan out slightly due to the passage of the jig through water as shown in FIG. 3. The weed guard serves to help prevent the jig from becoming entangled with weeds in the body of water being fished.

The body extension 11 is provided with at least one annular channel 28 for the attachment of optional fishing accessories, such as a flexible camouflage skirt composed of a plurality of elongated extremely flexible or pliable rubber or plastic filaments 29 held in place by an elastic ring or band 30 seated in channel 28. The pliable strands or filaments comprising the skirt are preferably arrayed generally uniformly about the periphery of the body extension and are secured by ring or band 30 about midway between their ends. They may be of a single color or variegated. Because of the pliability of the skirt filaments, when the jig is out of the water, they tend to flop haphazardly in all directions. However, when the jig is pulled through the water in the direction as indicated in FIG. 1, the skirt filaments tend to extend toward and beyond the hook. The skirt filaments are shown somewhat foreshortened in order to avoid obscuring other structure. Preferably they are of a length to completely camouflage the hook from the fish being sought.

Desirably a second annular channel 31 is provided in the body extension to receive a second camouflage skirt or some similar fishing accessory.

Because of environmental concerns, body 10, body extension 11 and cap 24 are preferably formed from lead-free brass. All other elements are desirably composed of non-leaching, non-toxic materials.

Referring to FIG. 4, there is shown a slightly modified form of rattle jig according to the present invention. The body 10A, body extension 11A, fish hook 14A, eyelet 17A, flat bottom face 18A and camouflage skirt 29A–30A are all substantially as previously described. A rattle chamber 20A in the form of a transverse recess of circular cross-section extends into the body from the flat face 18A. That recess has an annular shoulder 22A set inward from the flat face and adapted to receive the annular flange 23A of a flat cap 24A, as previously described. A noise-making rattle element in the form of a flat solid disc 32 is fit loosely within the chamber.

The fiber weed guard 27A is seated in an oblique transverse recess 21A in the top of the body 10A. The longitudinal axis of recess 21A lies in the same vertical plane as the longitudinal axis of the body and extension and at an angle of about 35 to 50 degrees relative thereto. In this configuration the weed guard is somewhat closer to the barb of fish hook 14A and helps limit damage to the top of the mouth of a fish caught with the jig.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A rattle jig for use in bass fishing which comprises:

A) a solid brass body of generally circular cross-section,

B) a forwardly extending integral body extension of lesser diameter,

C) a fish hook secured to the forwardmost end of said body extension, the shank of said fish hook being generally in alignment with the longitudinal axis of the body, D) at least one annular channel in the surface of the body extension, E) a transverse passage extending through said body, one end of said passage having a greater diameter than the other end, said larger diameter end of said passage constituting a rattle chamber, F) a cap closure covering the rattle chamber, G) at least one noise-making rattle element loosely held within the rattle chamber, H) a fiber weed guard secured to and extending radially outward from said body, spaced rearward of the barb of said fish hook, said fiber weed guard being composed of a bundle of stiff semi-rigid filaments adhesively sealed at one end within the smaller diameter end of the transverse passage, and I) an eyelet secured to the rearward end of said body for attaching the jig to a fish line.

2. A rattle jig according to claim 1 wherein the surface of said body extension has a first annular channel immediately adjacent the connection of said extension to the body, and a second annular channel between the first channel and fish hook.

3. A rattle jig according to claim 1 wherein said noise-making rattle element is an annular do-nut shaped ring.

4. A rattle jig according to claim 1 wherein said noise-making rattle element is a spherical ball.

5. A rattle jig according to claim 1 wherein said noise-making rattle element is a flat disc.

6. A rattle jig according to claim 1 wherein a camouflage skirt is provided, said skirt comprising an annular elastic sleeve seated in said annular channel in the body extension and a plurality of flexible filaments extending from said sleeve around the periphery of the channel.

7. A rattle jig for use in bass fishing which comprises:

A) a solid brass body of generally circular cross-section,

B) a forwardly extending generally longitudinally aligned integral body extension of lesser diameter, C) a fish hook secured to the forwardmost end of said body extension, the shank of said fish hook being centrally disposed within said body extension generally in alignment with the longitudinal axis of the body, D) a first annular channel in the surface of the body extension immediately adjacent the connection of said extension to the body, and a second annular channel between the first channel and fish hook, E) a first transverse recess extending into said body from the bottom thereof constituting a rattle chamber, F) a cap closure covering the rattle chamber, G) at least one noise-making rattle element loosely held within the rattle chamber, H) a second transverse recess extending into said body from the top thereof, I) a fiber weed guard secured to and extending radially outward from said body, spaced rearward of the barb of said fish hook, said fiber weed guard being composed of a bundle of stiff semi-rigid filaments adhesively sealed on one end within said second transverse recess, and J) an eyelet secured to the rearward end of said body for attaching the jig to a fish line.

8. A rattle jig for use in fishing which comprises:

A) a solid metallic body of generally circular cross-section,

B) a forwardly extending generally longitudinally aligned body extension of lesser diameter, C) a fish hook secured to the forwardmost end of said body extension, the shank of said fish hook being centrally disposed within said body extension generally in alignment with the longitudinal axis of the body, D) at least one annular channel in the surface of the body extension, E) a transverse passage extending through said body, one end of said passage having a greater diameter than the other end, said larger diameter end of said passage constituting a rattle chamber, F) a cap closure covering the rattle chamber, G) at least one noise-making rattle element loosely held within said rattle chamber, H) a fiber weed guard secured to and extending radially outward from said body, spaced rearward of the barb of said fish hook, said fiber weed guard being adhesively sealed within the smaller diameter end of said passage, and I) an eyelet secured to the rearward end of said body for attaching the jig to a fish line.

9. A rattle jig for use in fishing which comprises:

A) a solid metallic body of generally circular cross-section,

B) a forwardly extending generally longitudinally aligned body extension of lesser diameter, C) a fish hook secured to the forwardmost end of said body extension, the shank of said fish hook being centrally disposed within said body extension generally in alignment with the longitudinal axis of the body, D) a first annular channel in the surface of said body extension immediately adjacent the connection of said extension to the body, and a second annular channel between the first channel and fish hook, E) a rattle chamber within said body having a least one noise-making rattle element loosely held therein, F) a fiber weed guard secured to and extending radially outward from said body, spaced rearward of the barb of said fish hook, and G) an eyelet secured to the rearward end of said body for attaching the jig to a fish line.

* * * * *